March 25, 1947.　　　F. T. BLAYDES　　　2,417,905
PEANUT HARVESTER
Filed Oct. 25, 1943　　　3 Sheets-Sheet 1
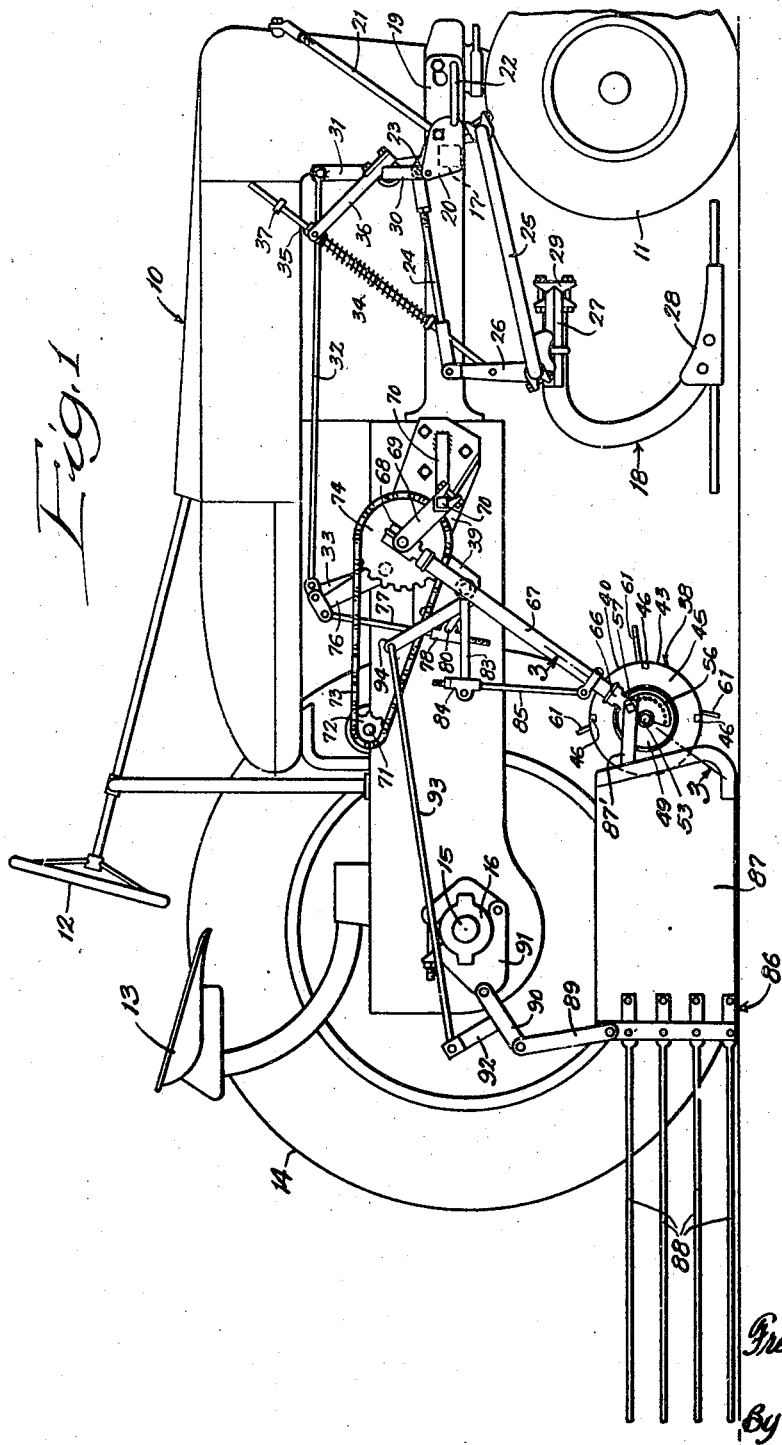
Inventor.
Frederick T. Blaydes,
By Paul O. Pippel
Attorney.

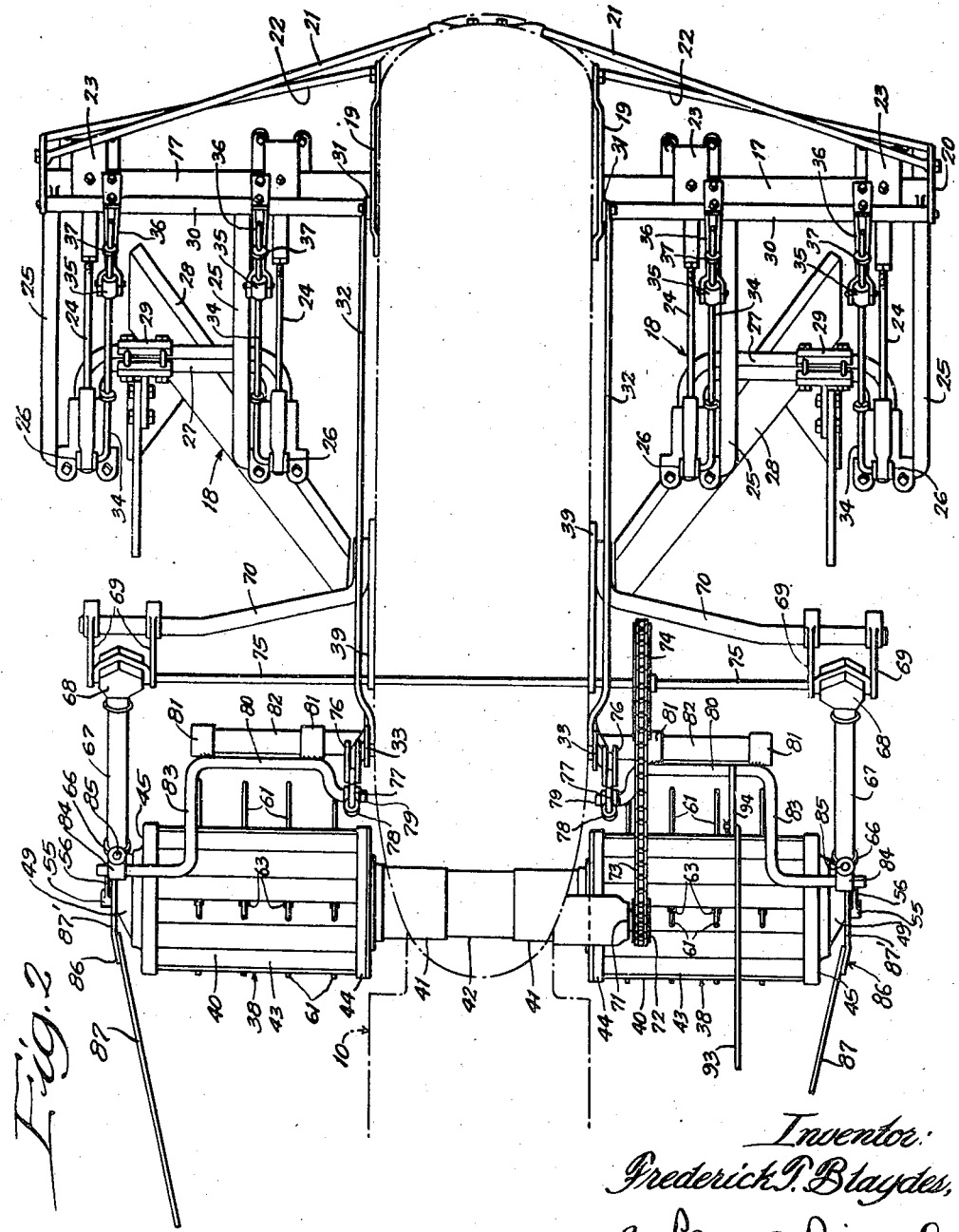

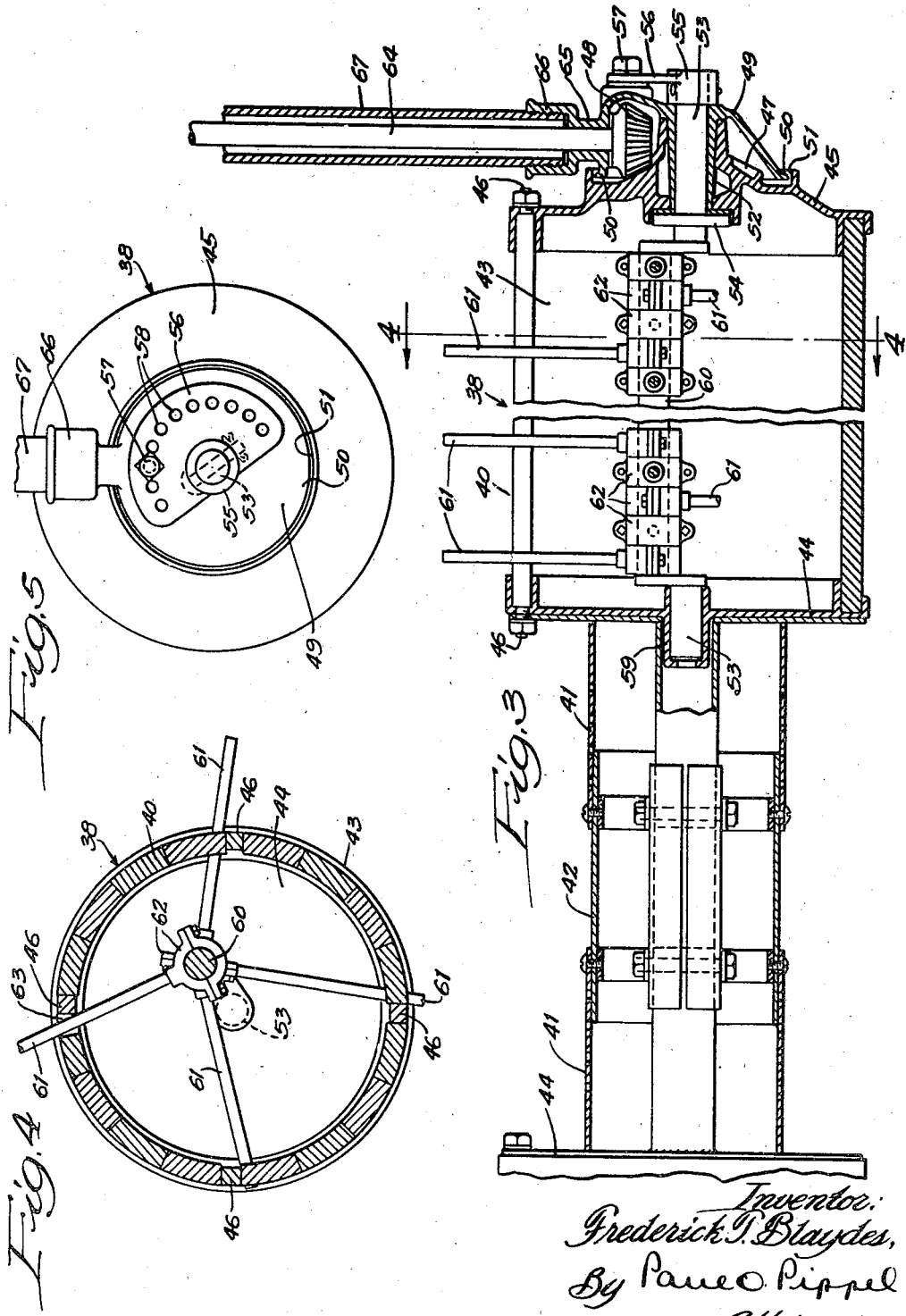

Patented Mar. 25, 1947

2,417,905

UNITED STATES PATENT OFFICE 2,417,905

PEANUT HARVESTER

Frederick T. Blaydes, Canton, Ill., assignor to International Harvester Company, a corporation of New Jersey Application October 25, 1943, Serial No. 507,541

4 Claims. (Cl. 55—9)

This invention relates to agricultural implements and particularly to harvesters. More specifically, the invention relates to machines for harvesting peanuts and like crops wherein the harvesting operation includes detaching the entire plant from the soil and shaking adhering dirt therefrom.

In the handling of peanut crops after maturity, it has been customary to first loosen the plant by conventional digger mechanism. Hand labor is then employed to pull the plant from the ground and shake the adhering dirt therefrom. After the plants are shaken, they are deposited in rows, after which they may be placed in suitable bunches at spaced intervals over the field to dry. The curing process is hastened by exposure of the crop to sunlight and air, so it will be readily understood that removal of dirt adhering to the peanuts hastens the curing thereof. The harvesting practice referred to is, of course, tedious and costly but has generally been followed in regions where peanuts are grown. However, with the recent expansion of demand for peanuts and their by-products, the necessity for more rapid and economical harvesting methods has been urgent. Therefore, an object of the present invention is the provision of a machine for harvesting peanuts and the like.

Another object is the provision of a harvesting machine wherein means are provided for loosening the plant from the soil, detaching the plant bodily, shaking it to remove adhering dirt, and depositing the detached plants in windrows.

A further object is the provision in a harvesting machine of vine-engaging and agitating means including a rotary drum having radially projecting fingers and means for varying the position of said fingers to accommodate the machine to varying soil and crop conditions.

Still another object is to provide novel means for driving the vine-engaging and agitating means.

These and other objects will become clear from the following detailed description when read in conjunction with the accompanying drawings, wherein:

Fig. 1 is a view in side elevation of a tractor having the harvester of the present invention mounted thereon;

Fig. 2 is a plan view of the digger and shaker mechanism shown in Fig. 1;

Fig. 3 is a cross-section taken along the line 3—3 of Fig. 1;

Fig. 4 is a section taken on the line 4—4 of Fig. 3; and

Fig. 5 is an enlarged end view of the shaker mechanism.

Referring to the drawings, and particularly Figs. 1 and 2 thereof, it will be noted that the numeral 10 designates the longitudinally extending body portion of a tractor having dirigible front wheels 11 steered by a steering mechanism 12, accessible to a driver's seat 13. The tractor is provided with rear drive wheels 14 mounted upon a transverse rear axle 15. Axle 15 is surrounded by a housing 16 serving for the attachment of working tools in a manner hereafter described. Mounted upon the forward portion of the tractor and at opposite sides thereof are laterally extending tool bars 17, each adapted to support for vertical movement a digger mechanism generally indicated at 18. It may be understood that each side of the tractor is similarly equipped, but, inasmuch as the parts are substantial duplicates, only the tools on one side thereof will be described. Bar 17 is attached to the tractor for easy removal by plate 19 affixed to the inner end of the bar. The outer end of the bar is provided with a bracing bracket 20 and brace rods 21 and 22, attached at one end to the bracket, are attached at their other ends to the front of the tractor and to the plate 19, respectively.

Mounted upon bar 17 by means of a bracket 23 is a frame structure comprising vertically spaced, parallel links 24 and 25, pivotally mounted on bracket 23 for vertical movement. The links 24 and 25 extend rearwardly and are pivoted at vertically spaced points upon an upstanding bracket 26, to the lower portion of which is attached one arm of a U-shaped member 27. The other arm of the U-shaped member is connected to a similar frame structure, as shown in Fig. 2. To the member 27 a digging tool 28 is attached by means of a bracket 29. Raising and lowering of the digger mechanism is effected by means of a bail 30 pivoted upon the plate 19 and bracket 20 and having an upstanding arm 31 connected by a rod 32 to an operating lever 33. Lever 33 is power operated by the tractor from a source not shown. Lifting movement is imparted to the working tool by a conventional lift rod 34 attached to bracket 26 and slidable through a trunnion 35 at the end of an arm 36 attached to bail 30. A collar 37 is provided for abutment against the trunnion 35.

Rearwardly of the digger 18, a rotary agitating mechanism or shaker, generally indicated at 38, is mounted upon the tractor by means of a plate 39. The shaker 38 includes, in the embodiment shown in the drawings, a pair of transversely extending rotatable drums 40 having reduced portions 41 adjustably connected by a member 42 for varying the distance between the drums (see Fig. 3). The elements of each drum are substantial duplicates and a description of one suffices for both. Drum 40 comprises a generally cylindrical body portion 43, an inner end plate 44, and an outer end plate 45 fastened to the body portion by bolts 46. Plate 45 is provided with gear teeth 47 adapted to mesh with a pinion 48 rotatably disposed in a housing 49 having a flange portion 50 arranged to fit within an annular recess 51 in the plate, and having a centrally bored bearing portion 52 upon which plate 45 is journaled for rotation and in which is journaled a stationary shaft 53. Shaft 53 is held against axial movement by inner and outer collars 54 and 55, respectively, keyed to the shaft. Shaft 53 is adjustably held against rotation in housing 49 by a radially extending arcuate member 56 affixed to collar 55 and apertured to receive a bolt 57 seated in the housing 49.

As will be clearly noted in Fig. 5, a number of openings 58 are provided in arcuate member 56 for the reception of bolt 57, so that the shaft 53 may be rotated and fixed in a plurality of adjusted positions for a purpose to be hereinafter described. The portion of the shaft 53 at the other end of the drum 40 is journaled in a bearing 59 in the plate 44, while within the drum an eccentric portion 60 is provided. On this eccentric portion 60 a number of radially projecting fingers 61 are attached for rotation thereupon by means of removable clamps 62. These fingers are arranged to project through circumferentially and axially spaced openings 63 in the periphery of the drum 40 for sliding movement therein. Upon rotation of the drum about the stationary shaft 53, the fingers 61 are likewise rotated about the eccentric shaft portion 60, and, as will be noted particularly well in Fig. 4, these fingers project farthest from the periphery of the drum at the point thereon nearest to the axis of the said shaft portion. Since the shaker is mounted to the rear of the digger mechanism, these fingers serve to engage the plants thrown up by the digger. As the drum is rotated, these fingers carry the vines rearwardly as they are shaken. Therefore, it is desirable that the fingers project farthest on the vine-engaging side and that they project the least on the opposite side to prevent tangling of the detached vegetation in the drum. However, when operating under varying conditions of soil, and density and height of plant foliage, it is desirable that the position at which the fingers project farthest from the drum be varied in order that best results in detaching the plants from the soil and passing them rearwardly may be obtained. This is accomplished by removing the bolt 57, turning the arcuate member 56, and therefore shaft 53, the desired amount, and reinserting the bolt in one of the openings 58.

The drum 40 is driven through the intermediary of the pinion 48, enclosed in housing 49, engaging teeth 47 on the drum plate 45. The pinion 48 is keyed to a shaft 64 extending through an opening in a member 65 integral with housing 49 and having a cup-like portion 66 interiorly threaded to receive a pipe 67 surrounding the shaft 64. Pipe 67 extends upwardly and terminates in a gear housing 68 pivotally supported between brackets 69 affixed to a laterally extending bar 70. The inner end of the bar 70 is rigidly affixed, as by welding, to the plate 39.

Thus, the outer end of the drum is suspended from the brackets 69, and the drum is capable of swinging movement with the pipe 67 about the point of pivot on the brackets 69. As clearly shown in Fig. 2, the outer end of the drum on the opposite sides of the tractor is similarly supported, and it may be understood that the drum parts so far described are substantial duplicates.

The drums 40 are driven from a pulley shaft 71 on the right side of the tractor, a sprocket 72 being keyed to the pulley shaft and drivingly connected by a chain 73 with a sprocket 74 keyed to a laterally extending shaft 75. The inner end of the shaft 75 is rotatably seated in the plate 39, and the other end passes through one of the brackets 69 and into the housing 68. Suitable gearing is provided in the housing 68 for transmitting power from the shaft 75 to the shaft 64. The shaker mechanism is driven from the pulley shaft at a higher speed than the ground travel of the tractor in order that the vegetation may be vigorously shaken. If desired, this speed may be varied by any suitable mechanism and satisfactory results have been achieved at speeds the same as or only slightly greater than ground travel.

Vertical swinging movement of the shaker mechanism about the pivot point on the brackets 69 to effect raising and lowering thereof is accomplished from a power lift arm 76 operable independently of the arm 33 in order that relative adjustment between the digging and shaking mechanisms may be obtained. A rod 77 connects the arm 76 to a member 78 pivoted upon a crank portion 79 of a rock arm 80 and having a sleeve portion for the reception of the rod 77. The rock arm 80 is affixed to bearings 81 rotatable upon a pipe 82 projecting from the side of the tractor. Another crank arm 83 on the rock arm 80 supports a pivoted member 84 having a sleeve portion for the reception of a connecting rod 85 attached at its lower end to the pipe 67. Movement of the shaker to and from working position is effected by rocking the arm 76, the movement thereof being about the point of pivot of the gear housing 68 upon the brackets 69.

Extending rearwardly of the shaker is a windrower comprising a pair of rearwardly converging guide members 86 attached at their forward ends to the outwardly projecting ends of the shaker drums on opposite sides of the tractor. Each guide member 86 comprises a body portion 87 and rearwardly projecting fingers 88. The member 86 is attached to the shaker mechanism by a forwardly projecting strap 87' apertured to receive the bolt 57. The rear end of the body portion 87 is suspended by a link 89 pivoted upon a crank 90, which in turn is pivoted upon a bracket 91 attached to the rear axle housing 16. An upstanding arm 92 on the crank 90 is connected by a rod 93 to an arm 94 fast on the rock arm 80. Thus, the guide member 86 is partly carried by the shaker mechanism and is moved vertically by the same lifting device.

Thus, it should be clear that a novel machine for harvesting peanuts and the like has been described which combines simplicity and economy with maximum efficiency. The digger mechanism passes below the surface of the ground and loosens the plants while the shaker mechanism mounted therebehind detaches the vegetation from the soil, shakes it vigorously and passes it rearwardly to be gathered by the windrower and deposited in rows. The plants may be left upon the ground to dry, or they may be gathered and removed from the field, depending upon the method of treatment desired and upon climatic conditions.

Having now described the invention, it should be understood that variations may be made therein without departing from the spirit of the invention or the scope of the appended claims.

What is claimed is:

1. In a machine for harvesting peanuts and the like, in combination, a tractor, digger means mounted upon the tractor for vertical movement with respect thereto, transversely extending rotary drum means mounted on the tractor for vertical movement with respect thereto and positioned rearwardly of said digger means in cooperative relation therewith to engage and detach plants removed by the digger means, said drum means having spaced peripheral apertures therein, a stationary shaft having projecting ends upon which the ends of said drum are journaled and a portion within said drum, radially projecting fingers mounted on the portion of said shaft within said drum for eccentric rotary movement with respect to the axis thereof and arranged to slidingly project through said apertures, means for driving said drum means at a peripheral speed equal to or higher than the ground travel of said tractor including gears on said drum and means for driving said gears from the tractor, a stationary gear housing journaled on said shaft, an arcuate member secured to the end of the shaft having spaced openings, and fixed means engageable with one of said openings, whereby circumferential displacement of said shaft may be effected.

2. In a machine for harvesting peanuts and the like, in combination, a tractor, digger means mounted upon the tractor for vertical movement with respect thereto, transversely extending rotary drum means mounted on the tractor for vertical movement with respect thereto and positioned rearwardly of said digger means in cooperative relation therewith to engage and detach plants removed by the digger means, said drum means having spaced peripheral apertures therein, a stationary shaft having projecting ends upon which the ends of said drum are journaled and a portion within said drum, radially projecting fingers mounted on the portion of said shaft within said drum for eccentric rotary movement with respect to the axis thereof and arranged to slidingly project through said apertures, means for driving said drum means, including gears on said drum and means for driving said gears from the tractor, a stationary gear housing journaled on said shaft, and means connecting said shaft and said housing for holding said shaft stationary, including means for optionally circumferentially displacing said shaft.

3. A machine for harvesting peanuts and like crops comprising a tractor, digger means mounted upon the forward portion of the tractor for uprooting the plants, transverse rotary agitator means mounted upon the tractor rearwardly of said digger adapted to shake the uprooted plants and toss them rearwardly, power means on the tractor for vertically moving said rotary agitator to and from operating position, longitudinally extending laterally spaced and rearwardly converging windrow means including elements connected at their forward ends to opposite ends of said rotary agitator for movement therewith, and means connecting said power means to said windrow means intermediate its length for vertical movement thereof simultaneously with vertical movement of said rotary agitator.

4. A machine for harvesting peanuts and like crops comprising a tractor, digger means mounted upon the forward portion of the tractor for uprooting the plants, rotary agitator means mounted upon the tractor rearwardly of said digger means and including a transversely extending drum having radially spaced peripheral apertures, a shaft upon which said drum is journaled, said shaft having an eccentric portion, radially extending fingers rotatable upon the eccentric portion of said shaft arranged for sliding reception in the apertures in said drum to engage the uprooted plants, shake them and toss them rearwardly, power means on the tractor for vertically moving said drum to and from operating position, longitudinally extending windrow means for receiving the vegetation tossed rearwardly by the rotary drum, means for connecting the forward end of said windrow means to said drum for movement therewith, and means connecting said power means to said windrow means intermediate its length for vertical movement thereof simultaneously with vertical movement of said rotary drum.

FREDERICK T. BLAYDES.

REFERENCES CITED

The following references are of record in the file of this patent:

UNITED STATES PATENTS

| Number | Name | Date |
| --- | --- | --- |
| 1,371,519 | Roosa | Mar. 15, 1921 |
| 1,316,625 | Lumm | Sept. 23, 1919 |
| 1,547,271 | Toney | July 28, 1925 |
| 229,106 | Dominy | June 22, 1880 |
| 2,240,066 | Bingham | Apr. 29, 1941 |
| 1,847,399 | Innes | Mar. 1, 1932 |
| 1,889,443 | Innes | Nov. 29, 1932 |